United States Patent
Huang et al.

(10) Patent No.: US 8,128,234 B2
(45) Date of Patent: Mar. 6, 2012

(54) POSITION ADJUSTMENT DEVICE FOR INTEGRATION ROD

(75) Inventors: Chien-Chang Huang, Hsin-chu (TW); Yung-Chuan Tseng, Hsin-chu (TW)

(73) Assignee: Coretronic Corporation, Hsin-chu (TW)

( * ) Notice: Subject to any disclaimer, the term of this patent is extended or adjusted under 35 U.S.C. 154(b) by 354 days.

(21) Appl. No.: 12/434,188

(22) Filed: May 1, 2009

(65) Prior Publication Data

US 2009/0296051 A1    Dec. 3, 2009

(30) Foreign Application Priority Data

Jun. 3, 2008  (TW) ................................ 97120536 A

(51) Int. Cl.
*G03B 21/14*  (2006.01)

(52) U.S. Cl. ................ 353/38; 353/30; 353/31; 353/34; 353/77; 353/78; 353/98; 353/99; 353/119; 353/122; 385/129; 385/133; 385/130; 385/131; 385/146

(58) Field of Classification Search ............... 353/98, 353/99, 119, 38, 122, 30, 31, 34, 77, 78; 359/443, 450, 453, 456, 460, 451, 457, 894; 348/208.99, 340, 208.3, 208.5, 208.7; 385/48, 385/130, 131, 146, 133, 129; 362/551, 581
See application file for complete search history.

(56) References Cited

U.S. PATENT DOCUMENTS

| 5,402,263 | A  | * | 3/1995  | Kita et al.    | 359/451 |
| 6,364,491 | B1 | * | 4/2002  | Okada et al.   | 353/101 |
| 6,915,063 | B2 | * | 7/2005  | Kawaai et al.  | 385/146 |
| 7,249,857 | B2 | * | 7/2007  | Lin            | 353/122 |
| 7,686,458 | B2 | * | 3/2010  | Aizawa et al.  | 353/98  |
| 7,717,572 | B2 | * | 5/2010  | Hsu et al.     | 353/97  |
| 7,828,449 | B2 | * | 11/2010 | Ho             | 353/102 |
| 2003/0053787 | A1 | * | 3/2003  | Lee          | 385/136 |
| 2006/0164859 | A1 | * | 7/2006  | Chiang       | 362/582 |

* cited by examiner

*Primary Examiner* — Georgia Y Epps
*Assistant Examiner* — Sultan Chowdhury
(74) *Attorney, Agent, or Firm* — Muncy, Geissler, Olds & Lowe, PLLC

(57) ABSTRACT

A position adjustment device for an integration rod includes a fixed plate, two resilient members, and two adjusting screws. The first resilient member is positioned between the fixed plate and the rod for exerting an elastic force on the rod in a first direction, and the second resilient member is positioned between the fixed plate and the rod for exerting an elastic force on the rod in a second direction different from the first direction. The first adjusting screw is inserted through the part of the housing and has a first end surface that presses against one side surface of the rod opposite the first resilient member. The second adjusting screw is inserted through the part of the housing and has a second end surface that presses against one side surface of the rod opposite the second resilient member. The first and the second end surface are arc surfaces.

19 Claims, 5 Drawing Sheets

POSITION ADJUSTMENT DEVICE FOR INTEGRATION ROD

CROSS REFERENCE TO RELATED APPLICATION

This application claims priority of application No. 097120536 filed in Taiwan R.O.C on Jun. 3, 2008 under 35 U.S.C. §119; the entire contents of which are hereby incorporated by reference.

BACKGROUND OF THE INVENTION

1. Field of the Invention

The invention relates to a position adjustment device for an integration rod used in an optical projection system.

2. Description of the Related Art

FIG. 1 shows a schematic diagram illustrating a conventional position adjustment device for an integration rod. Referring to FIG. 1, the position adjustment device is provided in a housing 102 of an optical engine to adjust the position of an integration rod 104 in the shape of a rectangular parallelepiped in the housing 102. The position adjustment device includes a fixed plate 106. The fixed plate 106 cooperates with the housing 102 to accommodate the integration rod 104, two resilient sheets 108 and 110, and adjusting screws 112 and 114 inserted through the housing 102 in an X-axis direction and a Y-axis direction, respectively. Further, the adjusting screws 112 and 114 press against the integration rod 104. When fastened, the adjusting screws 112 and 114 are fed in the X-axis direction and Y-axis direction, respectively, and, meanwhile, the elastic force of the resilient sheets 108 and 110 enables the integration rod 104 to continually keep in contact with the adjusting screws 112 and 114 so as to achieve a two-dimensional position adjustment for the integration rod 104.

However, in the conventional design shown in FIG. 1, the two adjusting screws 112 and 114 make an angle of 90 degrees with each other and their respective insertion directions are not a vertical or a horizontal direction. Hence, the use of adjusting screws 112 and 114 making the two-dimensional position adjustment is liable to interfere with other components in the housing 102. In that case, the entire optical engine is disassembled and fixed by a jig during the process of position adjustment. This is very inconvenient for the operation on position adjustment or damage repair.

FIG. 2 shows a schematic diagram illustrating another conventional position adjustment device for an integration rod. Referring to FIG. 2, the position adjustment device and the integration rod 200 are both provided in a housing 202. The position adjustment device, which permits position adjustments in X-axis direction and Y-axis direction to the integration rod 200, includes a fixed plate 204, two resilient sheets 206 and 208, two adjusting screws 210 and 212, and two push members 214 and 216. The push member 214 is provided between the adjusting screw 210 and the integration rod 200, and the push member 216 is provided between the adjusting screw 212 and the integration rod 200. The resilient sheets 206 and 208 are positioned opposite the push members 214 and 216, respectively. Besides, the resilient sheets 206 and 208 press against the integration rod 200. When the adjusting screws 210 and 212 are inserted through the housing 202 and push the push members 214 and 216, respectively, the components of force from push members 214 and 216 force the integration rod 200 to move in the X-axis direction and Y-axis direction, and, meanwhile, the elastic force of the resilient sheets 206 and 208 enables the integration rod 200 to continually keep in contact with the push members 214 and 216 so as to achieve a two-dimensional position adjustment for the integration rod 200.

In the conventional design shown in FIG. 2, though the effect that the two adjusting screws 210 and 212 are inserted through the housing 202 in a same direction is obtained, the additionally provided push members 214 and 216 increase the number of constituting members and fabrication costs.

BRIEF SUMMARY OF THE INVENTION

The invention provides a position adjustment device for an integration rod having high performance, simplified configuration, and low fabrication costs.

According to an embodiment of the invention, a position adjustment device for an integration rod includes a fixed plate, a first resilient member, a second resilient member, a first adjusting screw, and a second adjusting screw. The fixed plate is together with a part of a housing for an optical engine to define an accommodation space for accommodating the integration rod. The first resilient member is positioned between the fixed plate and the integration rod for exerting an elastic force on the integration rod in a first direction, and the second resilient member is positioned between the fixed plate and the integration rod for exerting an elastic force on the integration rod in a second direction different to the first direction. The first adjusting screw is inserted through the part of the housing of the optical engine and has a first end surface that presses against one side surface of the integration rod opposite the first resilient member. The second adjusting screw is inserted through the part of the housing and has a second end surface that presses against one side surface of the integration rod opposite the second resilient member. Each of the first end surface and the second end surface is a substantially arc surface.

In one embodiment, each of the first adjusting screw and the second adjusting screw has a round end, and at least one of the first resilient member and the second resilient member is a resilient sheet or spring.

In one embodiment, the insertion direction of the first adjusting screw is substantially identical to the insertion direction of the second adjusting screw.

In one embodiment, the insertion directions of the first adjusting screw and the second adjusting screw are the direction of gravity, and the first resilient member and the second resilient member hold two adjacent side surfaces of the integration rod, respectively.

In one embodiment, each of the first adjusting screw and the second adjusting screw has a step portion, the part of the housing of the optical engine is provided with two guide slots corresponding to the first adjusting screw and the second adjusting screw, respectively, and the depths of the guide slots determine maximum inserted distance of the first adjusting screw and the second adjusting screw.

In one embodiment, the accommodation space for the integration rod is defined only by a part of the housing, and the first resilient member and the second resilient member are positioned between the part of the housing of the optical engine and the integration rod.

According to the above embodiments, the two adjusting screws have an identical insertion direction, so a two-dimensional position adjustment to the integrator rod is achieved through only one adjusting direction to simplify the operation on position adjustment and damage repair. Besides, the two adjusting screws are parallel with each other to reduce the room required for the operation on position adjustment and the occupied space of an entire assembly. Further, the arc surface at the end of each adjusting screw permits a smooth sliding to reduce the friction between the screw and the integration rod, increase the accuracy of position adjustment, and avoid a jam in the position adjustment device. Also, the point contact manner allows for a fine tune on the position of the integration rod to effectively eliminate errors in position adjustment. Further, push members between the adjusting screws and the integration rod are no longer needed in the above embodiments to obtain a more stable adjustment, reduced number of constituting members, and lower fabrication costs. In addition, the arc end surface of an adjusting screw may relieve the influence of component's inclined angle, so the position adjustment device is well suited for different kinds of optical engines, provides excellent compatibility of components, and has simplified configuration and reduced fabrication costs.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 3:
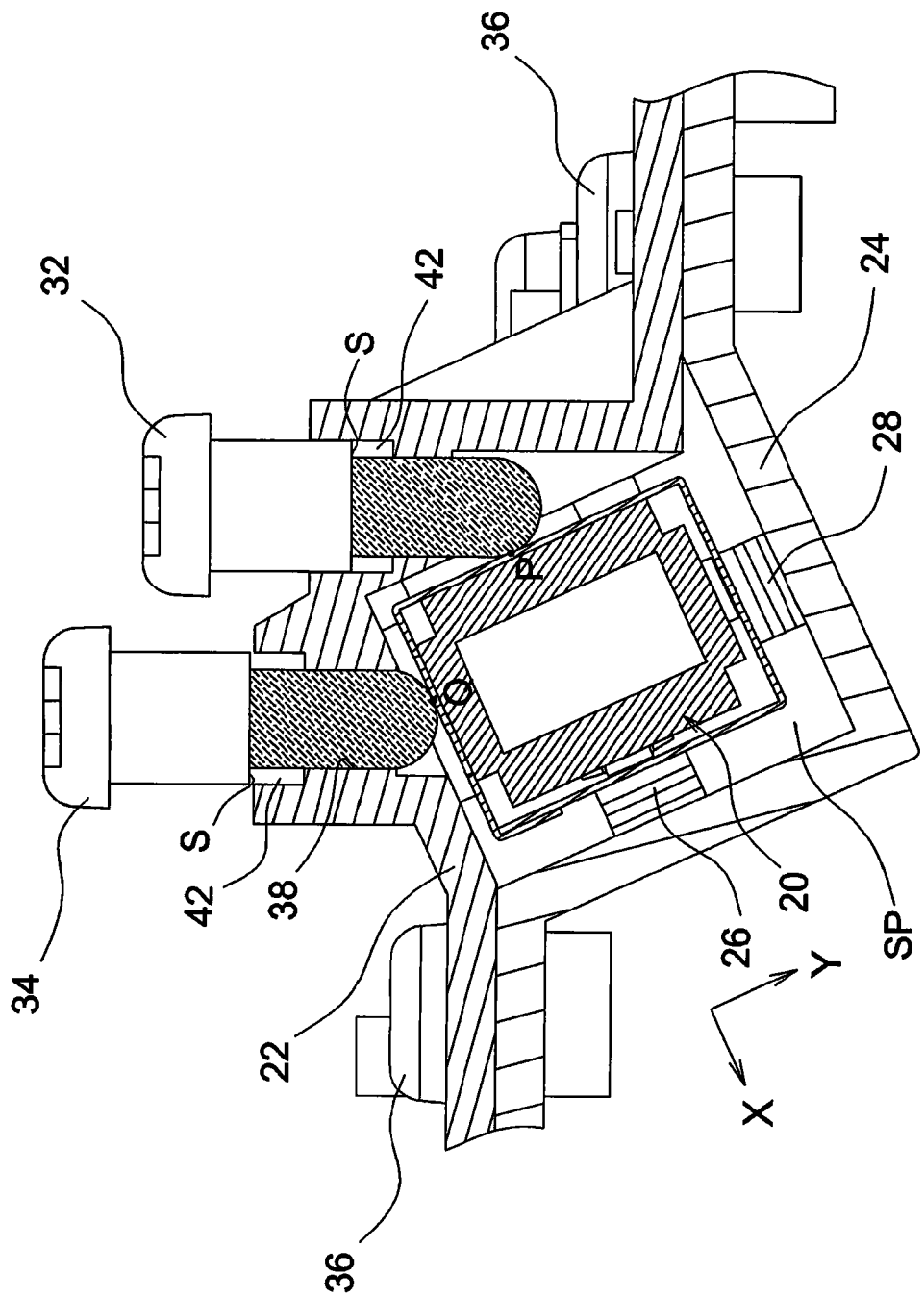
FIG. 3 shows a schematic diagram illustrating a position adjustment device for an integration rod according to an embodiment of the invention.

FIG. 3 shows a schematic diagram illustrating a position adjustment device for an integration rod according to an embodiment of the invention. Referring to FIG. 3, the position adjustment device permits position adjustments in an X-axis direction and a Y-axis direction to the integration rod 20. The position adjustment device includes a fixed plate 24, a first resilient member 26, a second resilient member 28, a first adjusting screw 32, a second adjusting screw 34, and a fastening member 36.

In this embodiment, a housing 22 of an optical engine over the integration rod 20 and the fixed plate 24 below the integration rod 20 define an accommodation space SP for accommodating the integration rod 20, and the fastening member 36 secures the fixed plate 24 on the housing 22. The fastening member 36 may include a plurality of screws, and the fixed plate 24 may be a metal plate fabricated by the machinery of punching or bending. The first resilient member 26 and the second resilient member 28 are positioned between the fixed plate 24 and the integration rod 20 and hold two adjacent side surfaces of the integration rod 20, respectively. The first resilient member 26 exerts an elastic force on the integration rod 20 in a first direction (opposite a pointing direction indicated by an arrow along the X-axis), and the second resilient member 28 exerts an elastic force on the integration rod 20 in a second direction (opposite a pointing direction indicated by an arrow along the Y-axis). The first resilient member 26 and the second resilient member 28 each may be a resilient sheet or a spring.

The first adjusting screw 32 is inserted through the housing 22 and presses against one side surface of the integration rod 20 opposite the first resilient member 26. The second adjusting screw 34 is inserted through the housing 22 and presses against one side surface of the integration rod 20 opposite the second resilient member 28. The first adjusting screw 32 and the second adjusting screw 34 continually keep in contact with the integration rod 20 due to the elastic force of the first resilient member 26 and the second resilient member 28. In that case, the insertion of the first adjusting screw 32 balances the elastic force of resilient members 26 and 28 and forces the integration rod 20 to move in the X-axis direction and the Y-axis direction. Similarly, the insertion of the second adjusting screw 34 balances the elastic force of resilient members 26 and 28 and also forces the integration rod 20 to move in the X-axis direction and the Y-axis direction. Thereby, the position of the integration rod 20 is allowed to be arbitrary adjusted in space. In this embodiment, each of the first adjusting screw 32 and the second adjusting screw 34 has a round end, so the end surface of each of the first adjusting screw 32 and the second adjusting screw 34 pressing against the integration rod 20 is an arc surface to provide point contact between each of the first adjusting screw 32 and the second adjusting screw 34 and the integration rod 20 (such as contact points P and Q shown in FIG. 3).

Referring to FIG. 3 again, in this embodiment, screw slots 38 are inwardly-threaded corresponding to the externally-threaded adjusting screws 32 and 34, and the screw slots 38 are formed at the top of the housing 22 of the optical engine. Further, each of the guide slots 42 that has a comparatively large width is formed adjacent to the top of each of the screw slots 38, and the diameter of an upper half of the adjusting screws 32 and 34 without threads is larger than the diameter of a lower half of the adjusting screws 32 and 34 with threads to form a step portion S. Since the diameter of the upper half of an adjusting screw is near the width of a guide slot 42 and the diameter of the lower half of the adjusting screw is near the width of a screw slot 38, the step portion S of the adjusting screw is blocked in the bottom of the guide slot 42 even the adjusting screw is inserted through the housing 22 to the full extent. Therefore, the depth of each of the guide slots 42 determines a maximum inserted distance of the first adjusting screw 32 and the second adjusting screw 34. This allows to avoid elastic fatigue occurring in the resilient members 26 and 28 or damage to the integration rod 20 as a result of undue insertion of the adjusting screws 32 and 34. Further, that the side surfaces of the adjusting screws 32 and 34 slide in the guide slot 42 may eliminate vibrations due to their insertion through the housing 22.

Figure 4:
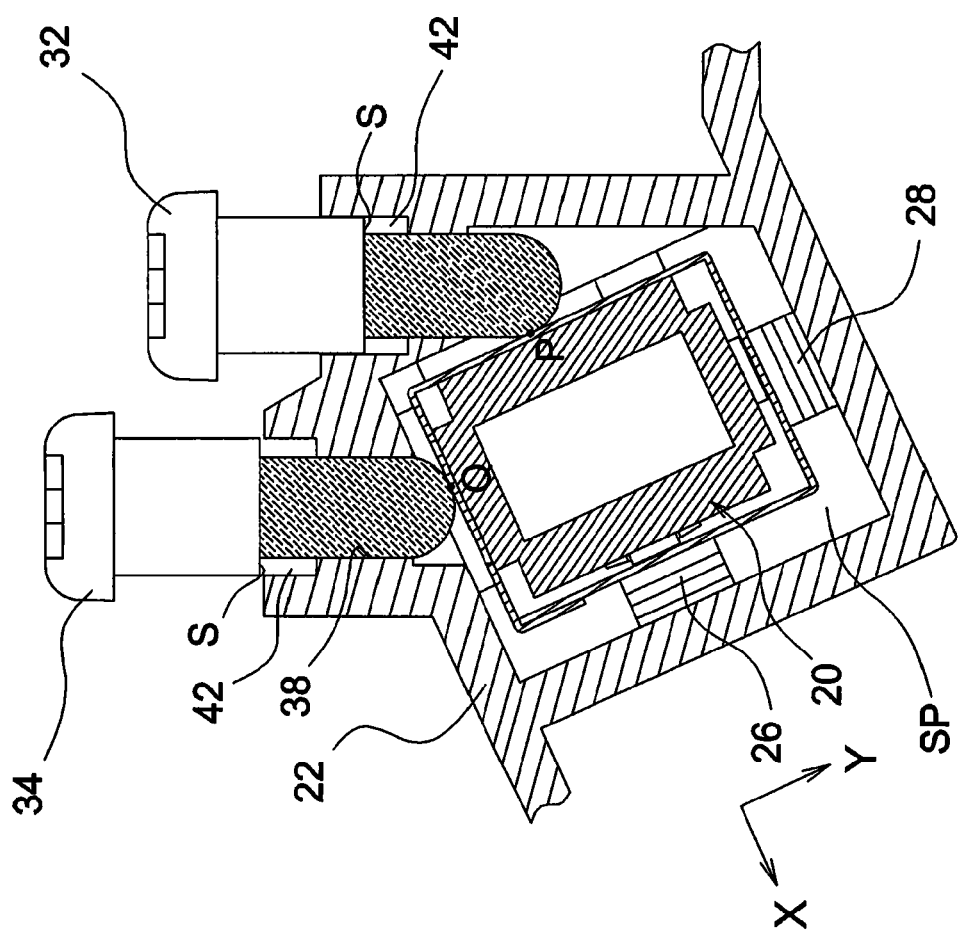
FIG. 4 shows a schematic diagram illustrating a position adjustment device for an integration rod according to another embodiment of the invention.

FIG. 4 shows a schematic diagram illustrating a position adjustment device for an integration rod according to another embodiment of the invention. Referring to FIG. 4, in this embodiment, the accommodation space SP for the integration rod 20 is defined only by a part of the housing 22 without the fixed plate 24 shown in FIG. 3. In that case, the first resilient member 26 and the second resilient member 28 are positioned between the part of the housing 22 and the integration rod 20.

Figure 5B:
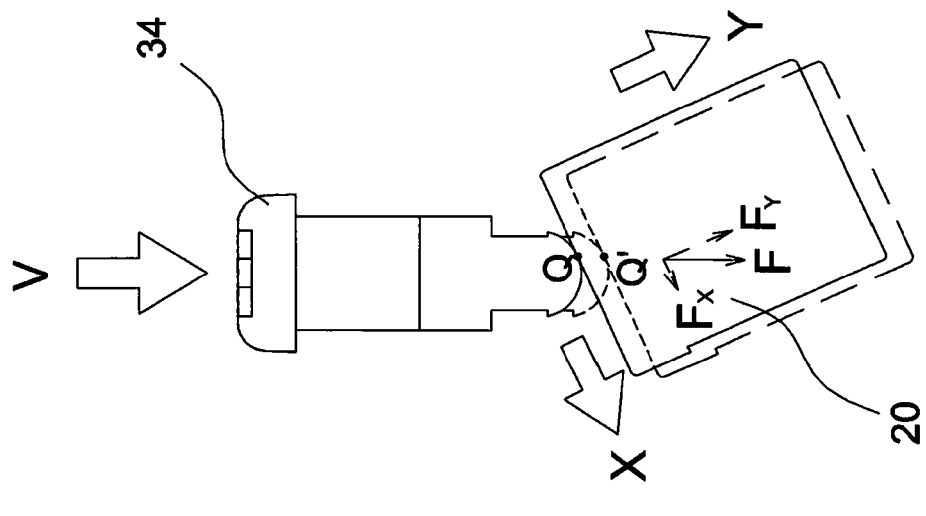
FIGS. 5A and 5B show schematic diagrams illustrating the movement of an integration rod according to an embodiment of the invention.
Figure 5A:
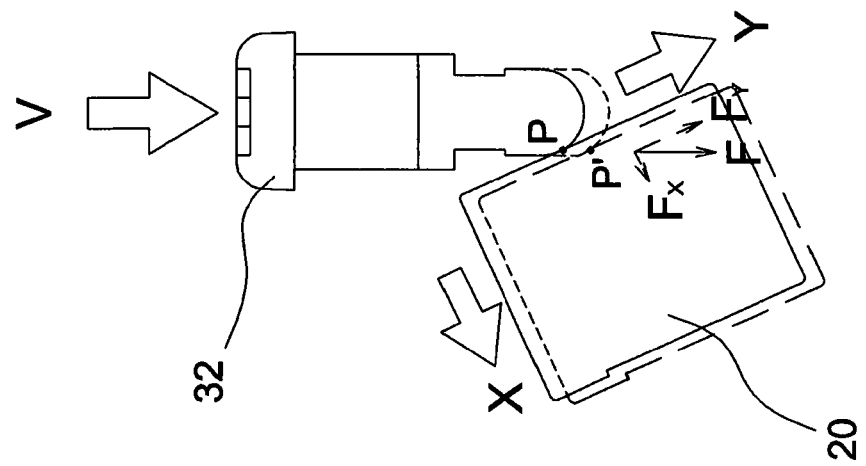

FIGS. 5A and 5B show schematic diagrams illustrating the movement of an integration rod according to an embodiment of the invention. Referring to FIG. 5A, when the first adjusting screw 32 is inserted through the housing 22 in the direction of gravity V (the contact point is shifted from P to P'), the X-axis component Fx and Y-axis component Fy of force F that the first adjusting screw 32 pushes the integration rod 20 force the integration rod 20 to move in the X-axis direction and Y-axis direction, respectively. Meanwhile, the resilient members 26 and 28 enable the moving integration rod 20 to continually keep in contact with the first adjusting screw 32. As shown in FIG. 5B, when the second adjusting screw 34 is inserted through the housing 22 in the direction of gravity V (the contact point is shifted from Q to Q'), the X-axis component Fx and Y-axis component Fy of force F that the second adjusting screw 34 pushes the integration rod 20 force the integration rod 20 to move in the X-axis direction and Y-axis direction, respectively. Meanwhile, the resilient members 26 and 28 enable the moving integration rod 20 to continually keep in contact with the second adjusting screw 34.

Figure 1:
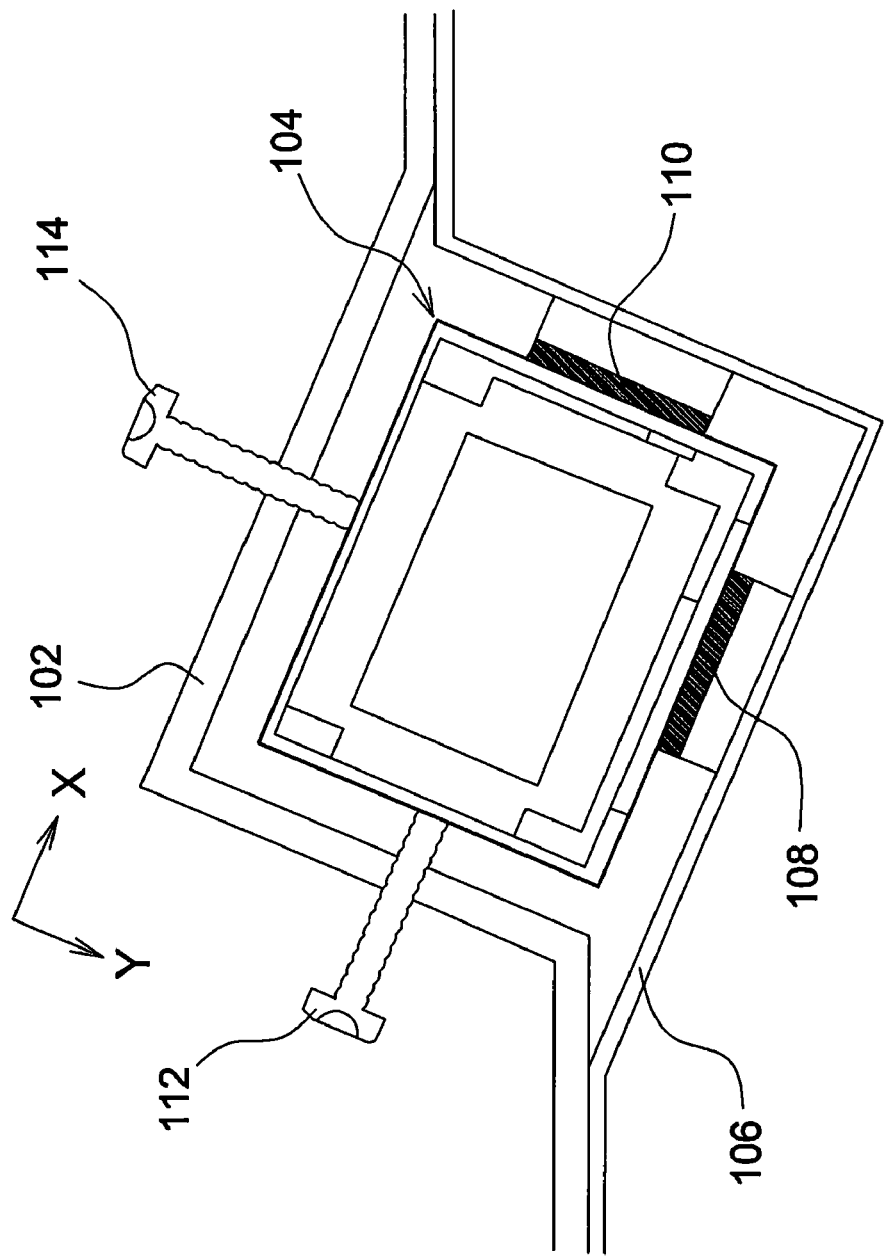
FIG. 1 shows a schematic diagram illustrating a conventional position adjustment device for an integration rod.
Figure 2:
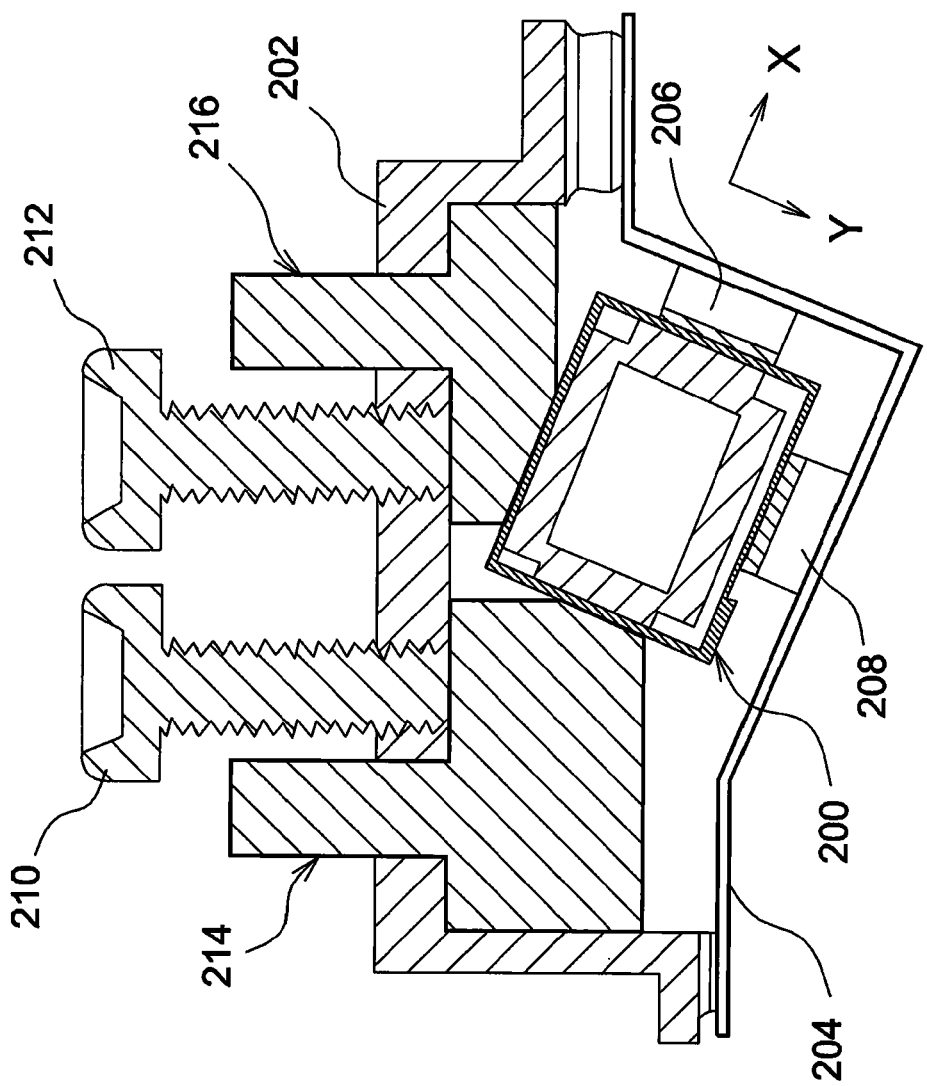
FIG. 2 shows a schematic diagram illustrating another conventional position adjustment device for an integration rod.

According to the above embodiments, the two adjusting screws 32 and 34 have a substantially identical insertion direction (such as the direction of gravity V), so a two-dimensional position adjustment to the integrator rod 20 is achieved through only one adjusting direction to simplify the operation on position adjustment and damage repair. Besides, the two adjusting screws 32 and 34 are parallel with each other to reduce the room required for the operation on position adjustment and the occupied space of an entire assembly. Further, the arc surface at the end of each adjusting screw permits a smooth sliding to reduce the friction between the screw and the integration rod, increase the accuracy of position adjustment, and avoid a jam in the position adjustment device. Also, the point contact manner allows for a fine tune on the position of the integration rod 20 to effectively eliminate errors in position adjustment. Further, compared with the conventional design shown in FIG. 2, the push members 214 and 216 between the adjusting screws and the integration rod are no longer needed in this embodiment to obtain a more stable adjustment, reduced number of constituting members, and lower fabrication costs. In addition, the arc end surface of an adjusting screw may relieve the influence of component's inclined angle, so the position adjustment device is well suited for different kinds of optical engines, provides excellent compatibility of components, and has simplified configuration and reduced fabrication costs.

Note the shape of the adjusting screws 32 and 34 is not limited, as long as their end surfaces are arc surfaces to provide point contact. Besides, the insertion directions of the adjusting screws 32 and 34 are not limited to the direction of gravity, and an oblique angle in relation to the direction of gravity can be selected to obtain a similar effect of position adjustment. Also, the insertion directions of the first adjusting screw 32 and the second adjusting screw 34 are preferably the same.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A position adjustment device for an integration rod, comprising:
   a fixed plate together with a part of a housing of an optical engine to define an accommodation space for accommodating the integration rod;
   a first resilient member positioned between the fixed plate and the integration rod for exerting an elastic force on the integration rod in a first direction;

a second resilient member positioned between the fixed plate and the integration rod for exerting an elastic force on the integration rod in a second direction different to the first direction;

a first adjusting screw inserted through the part of the housing of the optical engine and comprising a first end surface pressing against one side surface of the integration rod opposite the first resilient member; and a second adjusting screw inserted through the part of the housing of the optical engine and comprising a second end surface pressing against one side surface of the integration rod opposite the second resilient member;

wherein each of the first end surface and the second end surface is a substantially arc surface to provide point contact between each of the first adjusting screw and the second adjusting screw and the integration rod.

2. The position adjustment device for an integration rod of claim 1, wherein an insertion direction of the first adjusting screw is substantially identical to an insertion direction of the second adjusting screw.

3. The position adjustment device for an integration rod of claim 2, wherein the insertion directions of the first adjusting screw and the second adjusting screw are the direction of gravity.

4. The position adjustment device for an integration rod of claim 1, wherein each of the first adjusting screw and the second adjusting screw has a round end.

5. The position adjustment device for an integration rod of claim 1, wherein at least one of the first resilient member and the second resilient member is a resilient sheet.

6. The position adjustment device for an integration rod of claim 1, wherein at least one of the first resilient member and the second resilient member is a spring.

7. The position adjustment device for an integration rod of claim 1, wherein the first resilient member and the second resilient member hold two adjacent side surfaces of the integration rod, respectively.

8. The position adjustment device for an integration rod of claim 1, wherein each of the first adjusting screw and the second adjusting screw has a step portion, and the part of the housing of the optical engine is provided with two guide slots corresponding to the first adjusting screw and the second adjusting screw, respectively.

9. The position adjustment device for an integration rod of claim 8, wherein the depths of the guide slots determine maximum inserted distance of the first adjusting screw and the second adjusting screw.

10. The position adjustment device for an integration rod of claim 1, further comprising a fastening member securing the fixed plate to the part of the housing of the optical engine.

11. The position adjustment device for an integration rod of claim 10, wherein the fastening member comprises a plurality of screws.

12. The position adjustment device for an integration rod of claim 1, wherein the first direction is substantially perpendicular to the second direction.

13. A position adjustment device for an integration rod, the integration rod being accommodated in an accommodation space defined by at least a part of a housing of an optical engine, the position adjustment device comprising:

a first resilient member positioned between the part of the housing of the optical engine and the integration rod for exerting an elastic force on the integration rod in a first direction;

a second resilient member positioned between the part of the housing of the optical engine and the integration rod for exerting an elastic force on the integration rod in a second direction substantially perpendicular to the first direction;

a first adjusting screw inserted through the part of the housing of the optical engine and comprising a first end surface pressing against one side surface of the integration rod opposite the first resilient member, and a second adjusting screw inserted through the part of the housing of the optical engine and comprising a second end surface pressing against one side surface of the integration rod opposite the second resilient member, wherein each of the first end surface and the second end surface is a substantially arc surface to provide point contact between each of the first adjusting screw and the second adjusting screw and the integration rod.

14. The position adjustment device for an integration rod of claim 13, wherein an insertion direction of the first adjusting screw is substantially identical to an insertion direction of the second adjusting screw.

15. The position adjustment device for an integration rod of claim 14, wherein the insertion directions of the first adjusting screw and the second adjusting screw are the direction of gravity.

16. The position adjustment device for an integration rod of claim 13, wherein each of the first adjusting screw and the second adjusting screw has a round end.

17. The position adjustment device for an integration rod of claim 13, wherein the first resilient member and the second resilient member hold two adjacent side surfaces of the integration rod, respectively.

18. The position adjustment device for an integration rod of claim 13, wherein each of the first adjusting screw and the second adjusting screw has a step portion, and the part of the housing of the optical engine formed is provided with two guide slots corresponding to the first adjusting screw and the second adjusting screw, respectively.

19. The position adjustment device for an integration rod of claim 18, wherein the depths of the guide slots determine maximum inserted distance of the first adjusting screw and the second adjusting screw.

* * * * *